United States Patent [19]

Sugishima

[11] Patent Number: 5,440,410
[45] Date of Patent: Aug. 8, 1995

[54] CONTROL SYSTEM FOR TRANSMITTING AND RECORDING IMAGE DATA IN ACCORDANCE WITH A PREDETERMINED RECORDING WIDTH OR TYPE OF RECORDING MEDIUM

[75] Inventor: Kiyohisa Sugishima, Yokohama, Japan

[73] Assignee: Canon Kabushiki Kaisha, Tokyo, Japan

[21] Appl. No.: 320,556

[22] Filed: Oct. 11, 1994

Related U.S. Application Data

[63] Continuation of Ser. No. 261,021, Jun. 16, 1994, abandoned, which is a continuation of Ser. No. 164,838, Dec. 9, 1993, abandoned, which is a continuation of Ser. No. 765,944, Sep. 26, 1991, abandoned.

[30] Foreign Application Priority Data

Sep. 27, 1990 [JP]  Japan ................... 2-255299
Jan. 11, 1991 [JP]  Japan ................... 3-002242

[51] Int. Cl.$^6$ ............ H04N 1/21; H04N 1/034; H04N 1/333
[52] U.S. Cl. ................ 358/502; 358/435; 358/436; 358/296; 347/3; 395/114
[58] Field of Search ........... 358/296, 502, 503, 435, 358/436, 438, 439, 434, 468; 395/114; 347/3

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,593,295 | 6/1986 | Matsufuji et al. .......... 346/140 R |
| 4,723,129 | 2/1988 | Endo et al. . |
| 4,734,868 | 3/1988 | DeLacy .................. 346/140 R |
| 4,740,796 | 4/1988 | Endo et al. . |
| 4,916,638 | 4/1990 | Haselby et al. ........... 346/140 R |
| 4,953,995 | 9/1990 | Sims et al. ............... 400/121 |
| 5,111,307 | 5/1992 | Yoshino .................. 358/434 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Scott A. Rogers
*Attorney, Agent, or Firm*—Fitzpatrick, Cella, Harper & Scinto

[57] ABSTRACT

In a communication control system between a device for outputting image data, and a recording apparatus for recording an image on a recording medium in units of predetermined unit recording widths in accordance with the image data output from the device, the device requests, to the recording apparatus, information associated with an image data amount necessary for recording an image in the predetermined unit recording width, and the recording apparatus sends back the information associated with the image data amount to the device in response to the request from the device. The information associated with the image data amount is variable.

81 Claims, 14 Drawing Sheets

FIG. 7A

EXECUTION COMMAND

| CODE (HEX) | COMMAND NAME | COMMAND EXPLANATION | NUMBER OF BYTES FOR COMMAND STRUCTURE | NUMBER OF BYTES FOR STATUS |
|---|---|---|---|---|
| 81 | CTP - 65 | STATUS INTERVAL DESIGNATION | 2 | 1 |
| 88 | CTP - 69 | PRINT OPERATION START DESIGNATION | 1 | 1 |
| 8C | CTP - 71 | ONE-BAND PRINT READY | 1 | 1 |
| 8F | CTP - 72 | AREA DESIGNATION | 9 | 1 |
| 90 | CTP - 73 | PRINT ENFORCEMENT END | 1 | 1 |
| C3 | CTP - 98 | SHEET FEED STAGE SELECTION | 3 | 1 |

FIG. 7B

STATUS REQUEST COMMAND

| CODE (HEX) | COMMAND NAME | COMMAND EXPLANATION | NUMBER OF BYTES FOR COMMAND STRUCTURE | NUMBER OF BYTES FOR STATUS |
|---|---|---|---|---|
| 40 | CTP - 33 | WHOLE STATUS | 1 | 1 |
| 44 | CTP - 35 | SHEET INFORMATION | 1 | 2 |
| 46 | CTP - 36 | ERROR DETAILS | 1 | 3 |
| 52 | CTP - 42 | DEVICE TYPE | 1 | 1 |
| 54 | CTP - 43 | NUMBER OF JOINT PIXELS | 1 | 2 |
| 56 | CTP - 44 | NUMBER OF ONE-BAND WIDTH PIXELS | 1 | 2 |
| 58 | CTP - 45 | BLANK LENGTH | 1 | 8 |
| 5A | CTP - 46 | NUMBER OF ONE-BAND PRINTABLE PIXELS | 1 | 4 |

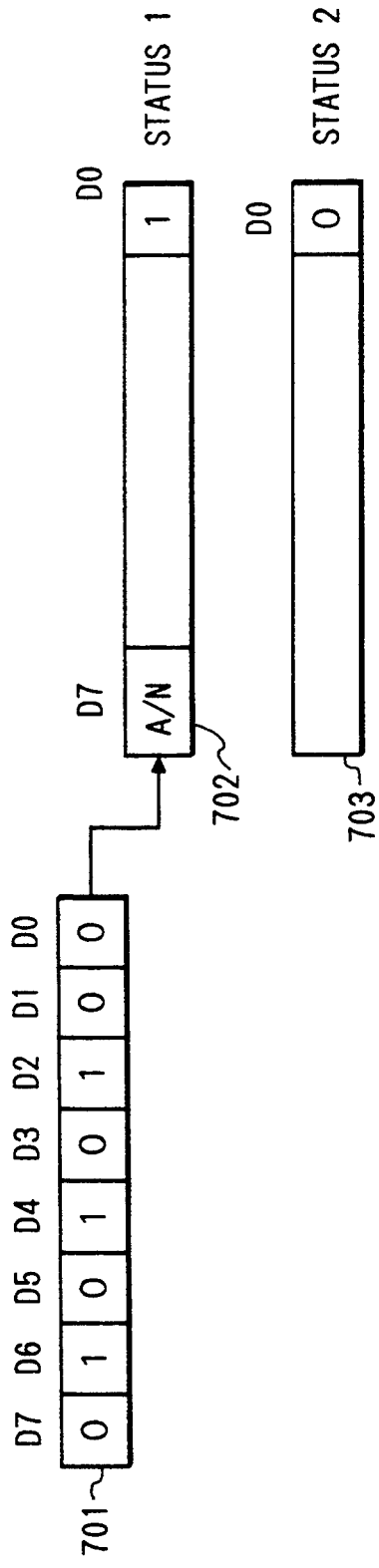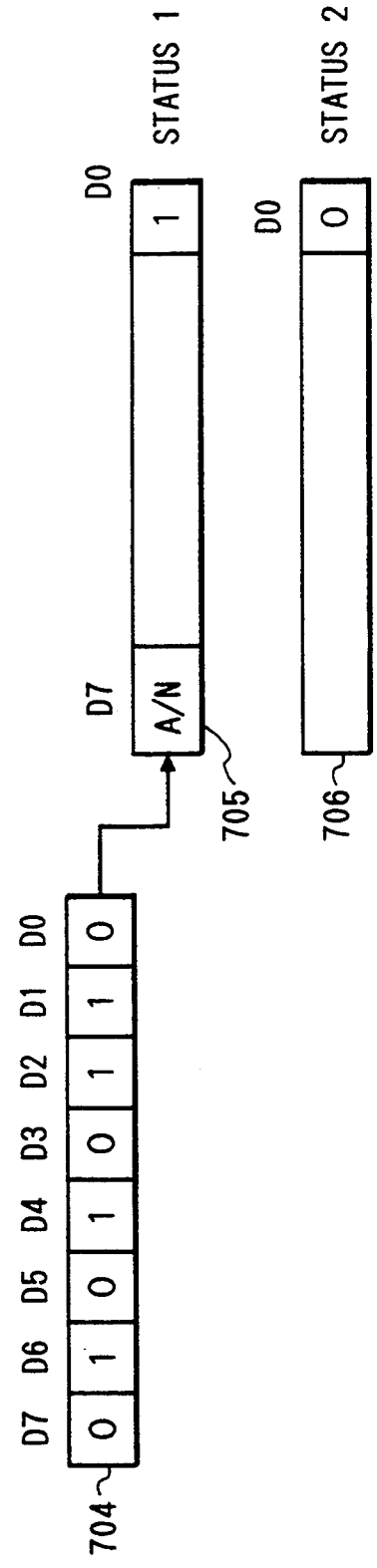

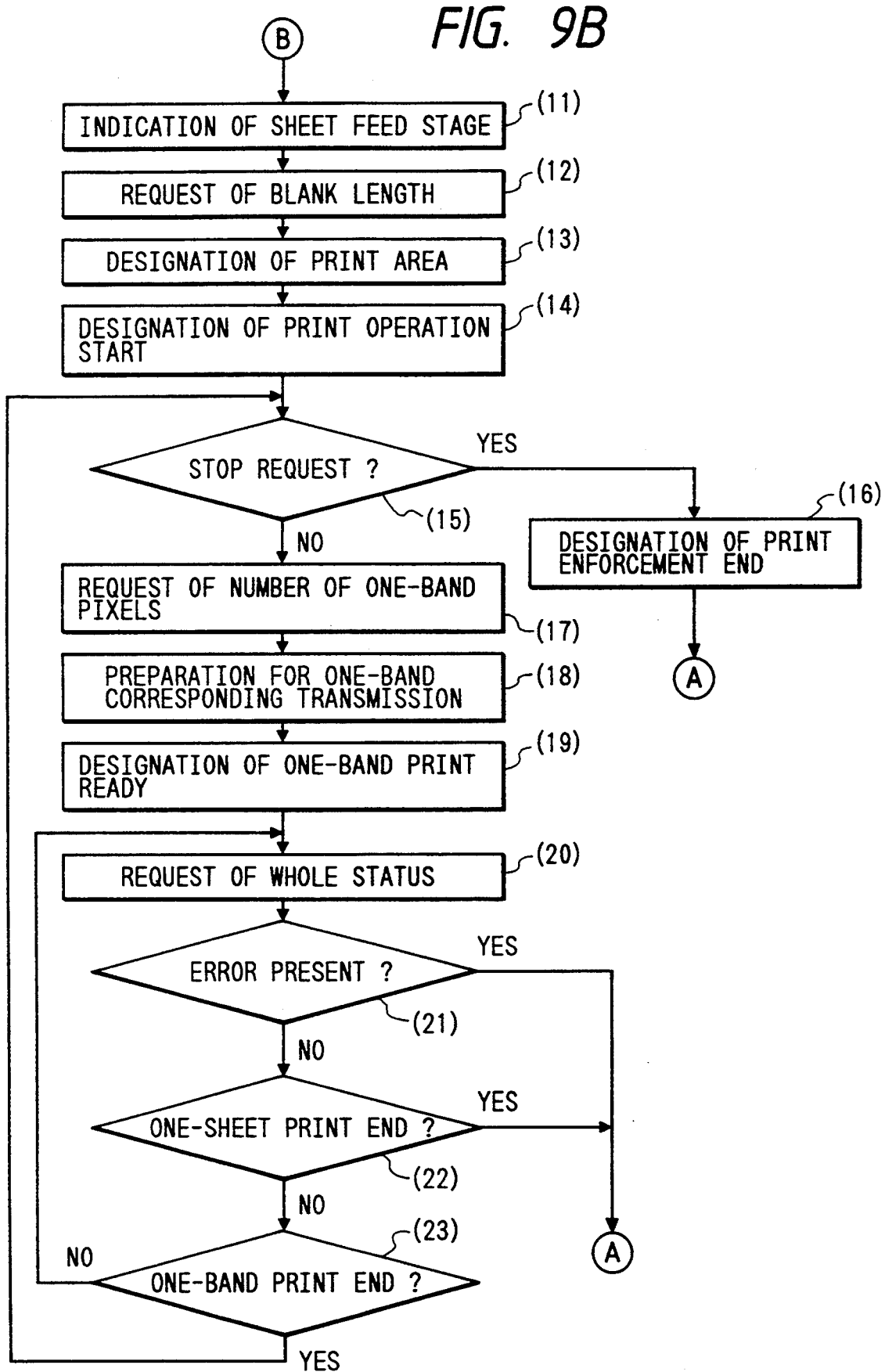

6BITS FROM D1 TO D6 OF C-PARAMETER 1 : SHEET FEED STAGE
   1 : ROLL
   2 : CASSETTE
   3 : MANUAL INSERTION
6BITS FROM D1 TO D6 OF C-PARAMETER 2 : SHEET TYPE
   1 : USUAL SHEET
   2 : BACK PRINT FILM (INTERNAL ILLUMINATION)
   3 : BACK PRINT FILM (REFLECTION MODE)
   4 : OHP

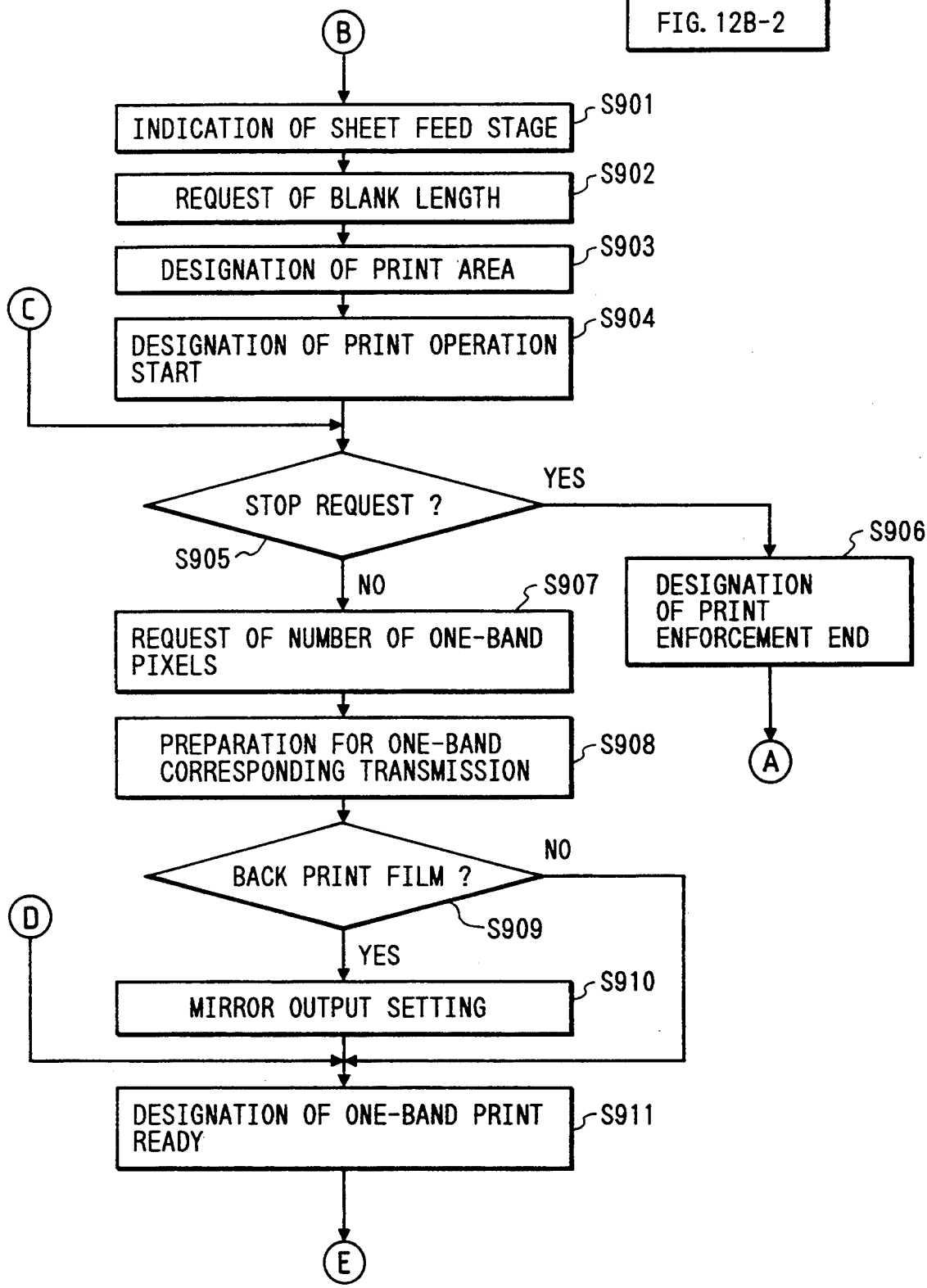

CONTROL SYSTEM FOR TRANSMITTING AND RECORDING IMAGE DATA IN ACCORDANCE WITH A PREDETERMINED RECORDING WIDTH OR TYPE OF RECORDING MEDIUM

This application is a continuation of application Ser. No. 08/261,021 filed Jun. 16, 1994, now abandoned, which is a continuation of Ser. No. 08/164,838 filed Dec. 9, 1993, abandoned, which is a continuation of application Ser. No. 07/765,944 filed Sep. 26, 1991, abandoned.

BACKGROUND OF THE INVENTION

The present invention relates to a communication control system for an image recording apparatus.

Conventionally, a recording apparatus which receives externally input image data, and obtains a reproduced image is known. In a recording apparatus of this type, e.g., an ink-jet printer which comprises multi-nozzles for discharging an ink, and can record a color image by discharging corresponding color inks from the nozzles onto a recording medium on the basis of externally input print data, multi-nozzle heads corresponding to the number of color inks are mounted, and a color image can be recorded by sequentially discharging inks from the nozzles on the basis of external image data (print data).

The multi-nozzle printer can record a binary image by executing binarization processing based on color print data. In this case, the following data communications (1) and (2) are often performed.

(1) A binary image obtained by converting multi-value image data into a binary image by an external apparatus, e.g., a host computer is transmitted to a printer, and is recorded on a recording medium.

(2) An external apparatus, e.g., a host computer transmits multi-value image data to a printer, and the printer records a binary image on a recording medium while executing binarization processing of the multi-value image data.

In particular, when binary image recording processing is performed based on multi-value image data by the method (2), the printer comprises an overlap memory having a binarization processing function, multi-value image data of a peripheral portion exceeding a print width are written in the overlap memory to overlap the data of the print width, and binary image data corresponding to the print width are generated on the basis of stored pixel data.

However, the external apparatus as a communication source side must check the overlap memory capacity on the basis of the type (registered) of a printer to be connected, and cannot detect the overlap memory capacity if the printer is a nonregistered printer. Thus, the external apparatus must execute transfer sequential processing for, e.g., designating the type of printer, and a considerable time is required until a desired binary image is obtained.

Furthermore, when some of the multi-nozzles suffer from ink discharging errors, print processing is interrupted, or is continued with errors. Thus, a desired color image cannot often be obtained.

Some ink-jet printers can record data on a plurality of types of sheets such as roll paper, cut sheets, OHP sheets, and the like. However, such printers must change a print sequence depending on the types of sheets to be subjected to recording, and must comprise, e.g., large capacity image memories to cope with this problem.

SUMMARY OF THE INVENTION

The present invention has been made in consideration of the above situation, and is as its object to provide an improved communication control system.

It is another object of the present invention to provide a communication control system which can perform data transmission to match with a print condition.

It is still another object of the present invention to provide a communication control system in which data associated with a print capacity is transmitted from the image recording apparatus side, and a desired amount of data can be transmitted while varying the amount of data to be transmitted to match with a print condition.

It is still another object of the present invention to provide a communication control system in which data associated with a one-line print width or data associated with an overlap amount of data necessary for printing one-line data is transmitted from the image recording apparatus side, and the desired amount of data can be transmitted while varying the amount of data to be transmitted.

It is still another object of the present invention to provide a communication control system which can change a print sequence without increasing a memory for storing image data.

The above and other objects of the present invention will become apparent from the accompanying drawings, and the following descriptions.

BRIEF DESCRIPTION OF THE DRAWINGS

FIGS. 7A and 7B show communication data between the controller and the printer main body shown in FIG. 2;

FIGS. 8A and 8B show bit structures of execution commands and status request commands shown in FIGS. 7A and 7B;

FIGS. 9A and 9B are flow charts showing a print operation control sequence of the controller;

FIGS. 12A, 12B, 12B-1, and 12B-2 are flow charts showing another print operation control sequence of the controller.

DETAILED DESCRIPTION OF THE PREFERRED EMBODIMENTS

Figure 1:
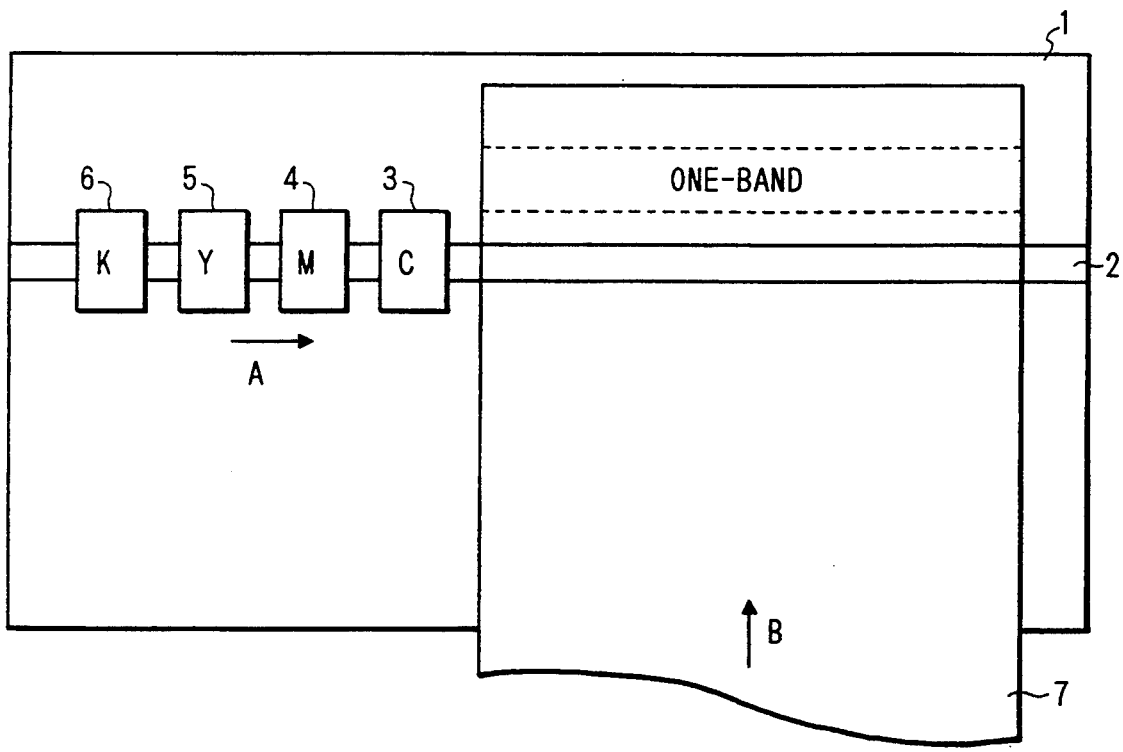
FIG. 1 is a block diagram for explaining a print mechanism of a recording apparatus according to an embodiment of the present invention.

FIG. 1 is a block diagram for explaining a print mechanism of a recording apparatus which embodies the present invention, and exemplifies an ink-jet type multi-nozzle printer.

In FIG. 1, a printer main body 1 discharges color inks to reproduce a full-color image on a sheet 7 as a recording medium while reciprocally scanning the sheet 7 in a direction of an arrow B (sub-scanning direction) by, e.g., a stepping motor and guide rollers (neither are shown). Note that a stay 2 is arranged on the main body 1.

Multi-nozzle heads 3 to 6 respectively store cyan, magenta, yellow, and black inks. In this embodiment, the multi-nozzle heads 3 to 6 produce bubbles by heat energy generated by electro-thermal converters, and discharge ink droplets by the bubbles, thereby recording data.

In each of the multi-nozzle heads 3 to 6, 128 nozzles are aligned in the sheet carrying (sub-scanning) direction B, and a diameter per unit nozzle is 63.5 $\mu$m, so that each head can perform a print operation for 8,128 mm at a time. The multi-nozzle heads 3 to 6 are scanned in a direction of an arrow A (main scanning direction) in FIG. 1 on the stay 2. Thus, a color or monochrome print operation having a print width (band) of 8.128 mm can be performed during one scanning. Therefore, the sheet 7 is repetitively subjected to a one-band print operation in the direction of the arrow B, thus obtaining a reproduced image thereon.

Figure 2:
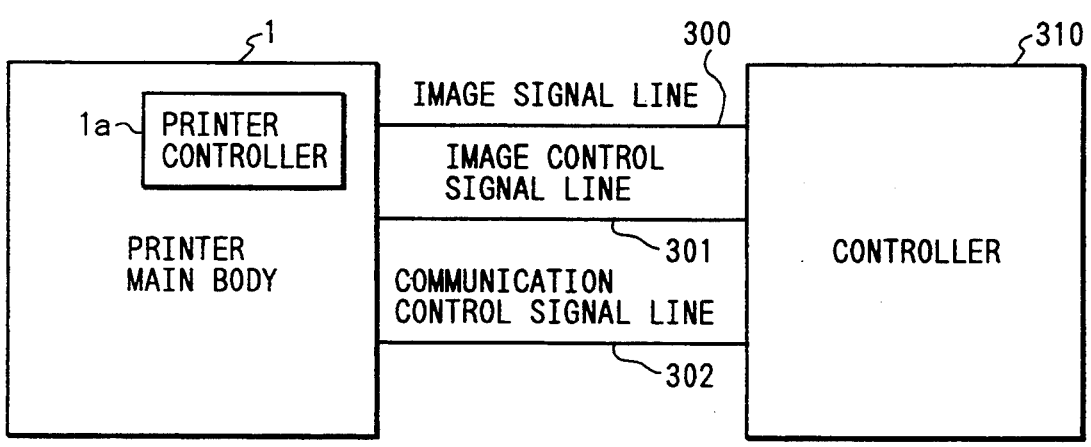
FIG. 2 is a block diagram for explaining a control arrangement of a printer main body shown in FIG. 1.

FIG. 2 is a block diagram for explaining a control arrangement of the printer main body 1 shown in FIG. 1, and the same reference numerals in FIG. 2 denote the same parts as in FIG. 1.

In FIG. 2, a controller 310 as an external apparatus is connected to the printer main body 1 via an image signal line 300, an image control signal line 301, and a communication control signal line 302. The controller 310 and the printer main body 1 communicate with each other, so that, for example, the controller 310 transmits 8-bit code data in a command format to the printer main body 1, and the printer main body 1 analyzes the transmitted command and sends back response data (status) corresponding to the received code data to the controller 310. A printer controller 1a comprises an image buffer which also serves as a joint memory, a binarization processing means, and the like.

The image signal line 300 includes eight signal lines, and transmits three, e.g., red, green, and blue picture element multi-value data (8 bits in this embodiment) to the printer main body 1 in synchronism with a control signal on the image control signal line 301.

The image control signal line 301 transmits a control signal for communicating an image to the controller 310, as will be described in detail later.

The communication control signal line 302 is one for communicating various data, and includes an interface such as an RS232C.

In the recording apparatus with the above arrangement, when print data exceeding a unit print width of a recording means (constituted by the multi-nozzle heads 3 to 6, and the like in this embodiment) is received, the binarization processing means (a binarization processing circuit 405 to be described later in this embodiment) generates binary print data corresponding to the unit print width on the basis of the print data exceeding the unit print width of the recording means, and a first communication means (the printer controller 1a in this embodiment) transmits a print data amount exceeding the unit print width in accordance with a request from an external apparatus, thus causing the external apparatus to recognize the print data amount exceeding the unit print width which is uniquely determined for each type of printer.

When the external apparatus requests transmission of a desired reception data amount corresponding to the print width of the recording means, a second communication means (also the printer controller 1a in this embodiment) sends back a desired reception data amount corresponding to an arbitrary print width which can be printed by the recording means in response to the above request, and the external apparatus varies a transmission data amount to match with a print condition of a printer to be connected.

Furthermore, the recording means records an image on the recording medium while generating binary print data corresponding to the unit print width on the basis of color print data exceeding the unit print width of the recording means, which is generated by the binarization processing means.

Figure 3:
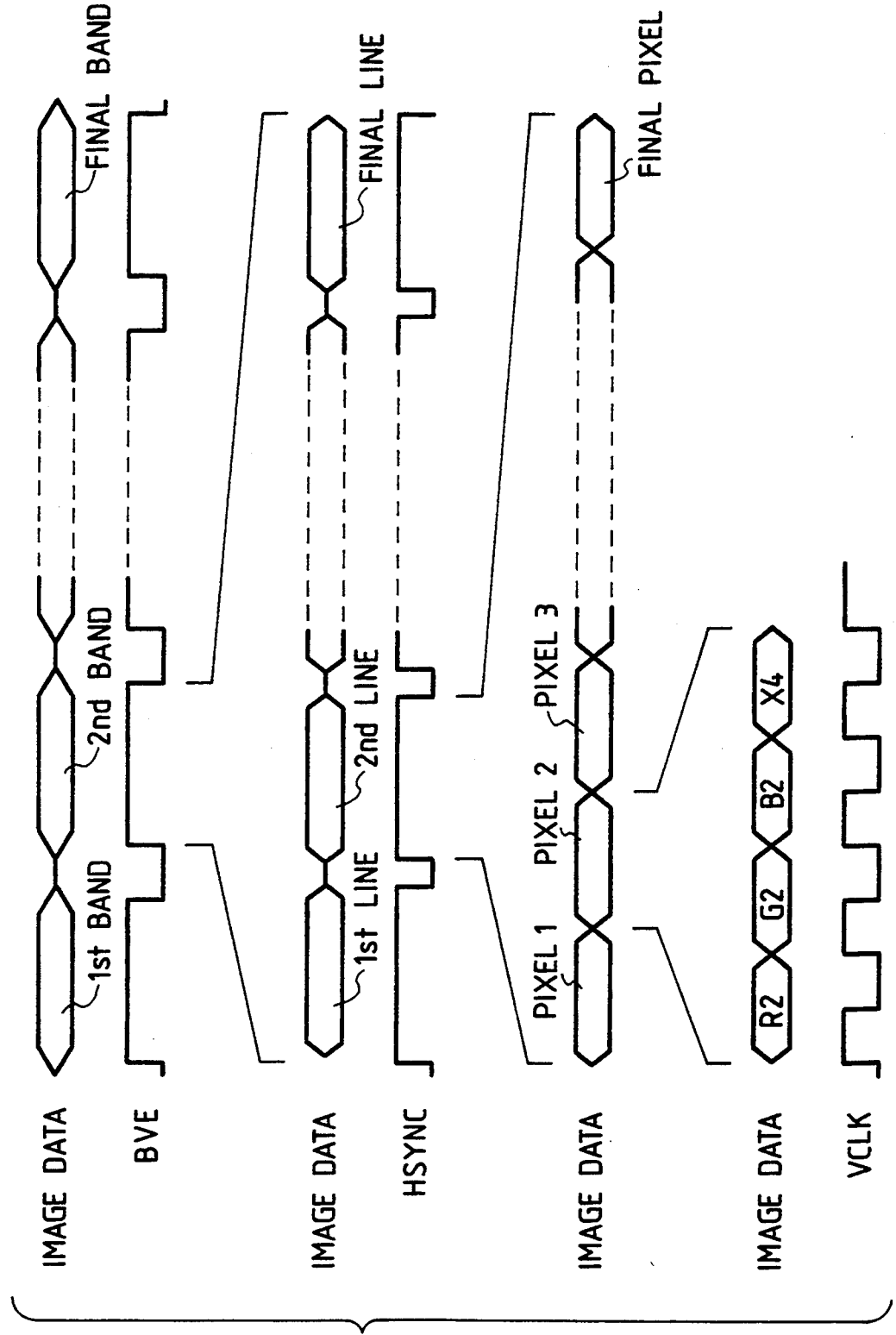
FIG. 3 is a chart for explaining image data reception processing from a controller shown in FIG. 2.

FIG. 3 is a chart for explaining image data reception processing from the controller 310 shown in FIG. 2. As described above, image data are transmitted in units of bands. In this case, image data corresponding to the number of bands necessary for obtaining a reproduced image are sent from the controller 310 to the printer main body 1.

Communications in units of bands are performed in synchronism with an image identification signal BVE. One-band image data is constituted as a main-scanning group of image data for one line (normally, 128 pixels) corresponding to the number of nozzles. One-line image data is transmitted in synchronism with a horizontal sync signal HSYNC as an image control signal.

One-line image data is constituted by image data corresponding in number to nozzles.

Image data is constituted by R, G, and B picture element data of three primary colors as constituting elements of color data, and dummy picture element data (each picture element=8 bits). The picture element data are transmitted in synchronism with an image clock VCLK as an image control signal.

Figure 4:
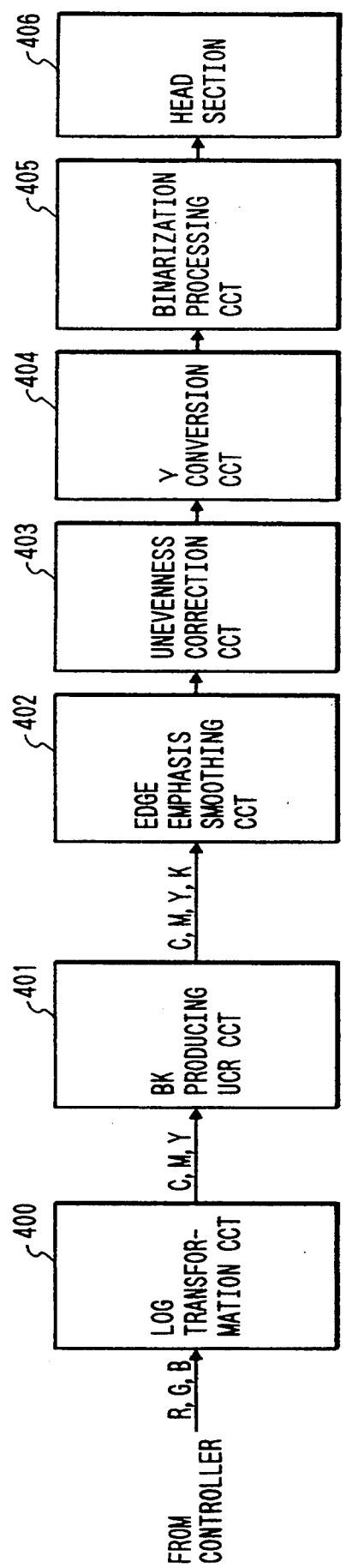
FIG. 4 is a block diagram for explaining a schematic arrangement of a printer controller shown in FIG. 2.

FIG. 4 is a block diagram for explaining a schematic arrangement of the printer shown in FIG. 2. The arrangement and operation of the printer will be described below.

One pixel (three, i.e., R, G, and B picture elements) data transmitted from the controller 310 is converted into cyan (C), magenta (M), and yellow (Y) density data by a LOG transformation circuit 400. A BK producing-.UCR circuit 401 produces a black signal (BK). An edge emphasis.smoothing circuit 402 performs edge emphasis processing and smoothing processing of the data. The data are input to an unevenness correction circuit 403 for correcting an unevenness caused by manufacturing precision of the nozzles and the like. The data are then subjected to a density correction by a $\gamma$ correction or conversion circuit 404 on the basis of ink characteristics of the respective colors. The corrected data are then binarized by the binarization processing circuit 405 (to be described later), and the binary data are printed on the sheet 7 by a head section 406.

Figure 5:
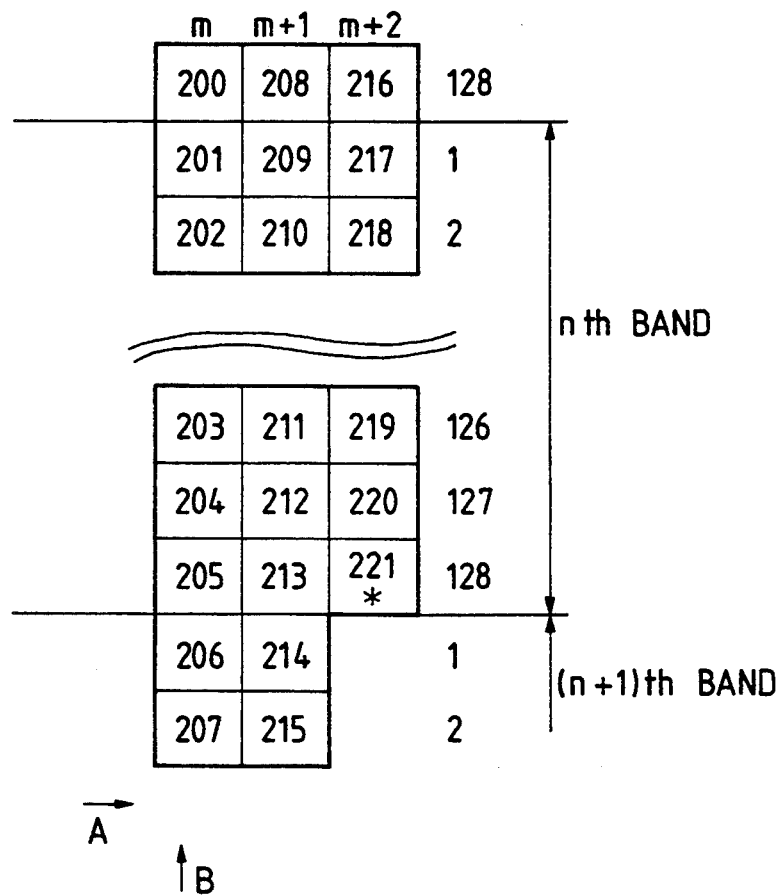
FIG. 5 is an illustration for explaining a binarization processing method by a binarization processing circuit shown in FIG. 4.

FIG. 5 is an illustration showing a binarization processing method by the binarization processing circuit 405 shown in FIG. 4.

As can be seen from FIG. 5, when a pixel 221 is to be binarized, binarization processing is performed with reference to a total of 12 previously binarized pixels 203 to 207, 211 to 215, 219, and 220.

Since each head comprises 128 nozzles, when pixels corresponding to the 128th nozzle are to be correctly binarized, image data of pixels 206, 207, 214, and 215 to be printed in the next band are required, and 130 pixels are required as the number of pixels transmitted from the controller 310 in one line.

In this embodiment, the edge emphasis-smoothing circuit 402 can perform edge emphasis.smoothing processing, and the edge emphasis.smoothing processing uses a 3×3 pixel matrix having a pixel of interest as the center.

Therefore, in order to execute edge emphasis.-smoothing processing of the first pixel of a given line, the final picture element of the immediately preceding band in the same line is required. For this reason, in order to print one-line data, the band width requires joint pixel data (pixel data necessary for normally joining adjacent bands) including one pixel in the immediately preceding band and two pixels in the next band, and the band width is normally defined by 131 pixels. As shown in FIG. 5, in the case of an mth line, when an nth band is to be printed, the controller 310 transmits pixels 200 to 207, and when an (n+1)th band is to be printed, it starts transmission from the pixel 205. As a result, the pixels 200 and 205 to 207 are transmitted to overlap each other.

Figure 6:
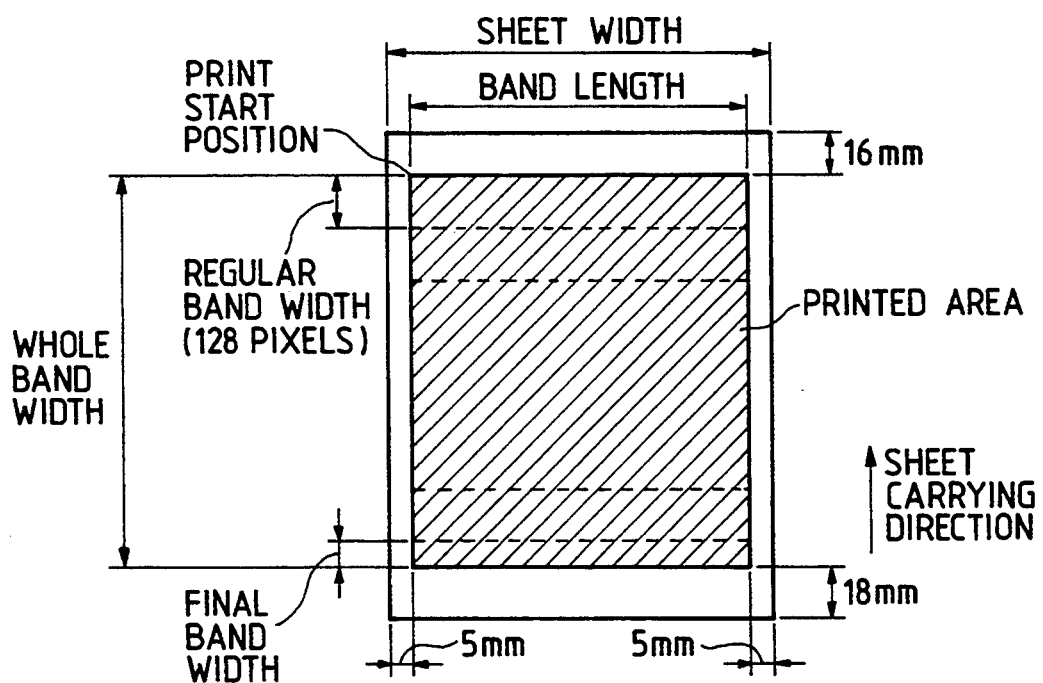
FIG. 6 is an illustration showing a reproduced image area printed by a head section shown in FIG. 4.

FIG. 6 shows a reproduced image area printed by the head section 406 shown in FIG. 4.

As can be seen from FIG. 6, right and left blanks (margins) of 5 mm, a leading blank of 16 mm, and a trailing blank of 18 mm (non-print areas) are set due to mechanical limitations of the printer main body 1.

An image is reproduced by sequentially printing bands indicated by dotted lines in FIG. 6 in the sheet carrying direction.

In this case, although one band is regularly printed with a 128-pixel width, the final band often includes an irregular number of pixels due to the limitation of the blank. As for the above-mentioned joint pixels, processing is performed by transferring the same data as the first pixel as a leading joint pixel of the first band, and the same data as the final pixel of a corresponding line as a trailing joint pixel of the last band by the controller 310.

FIGS. 7A and 7B show communication data between the controller 310 and the printer main body 1 shown in FIG. 2. FIG. 7A shows a list of principal execution commands (transmitted when the controller 310 requests an operation to the printer main body 1) to be transmitted from the controller 310 to the printer main body 1, and FIG. 7B shows a list of principal status request commands (transmitted when the controller 310 wants to obtain data from the printer main body 1) to be transmitted from the controller 310 to the printer main body 1.

As described above, control data forms one code by 8 bits in the RS232C format. In this case, the controller 310 sends an instruction (command), and the printer main body 1 sends back response data (status) in response to the command.

An execution command (code $81_{HEX}$) shown in FIG. 7A corresponds to a status interval designation command, and is transmitted from the controller 310 to the printer main body 1 when an interval time of responses from the printer main body 1 is designated.

An execution command (code $88_{HEX}$) corresponds to a print operation start designation command. Upon reception of this command, the printer main body 1 starts print pre-processing such as a sheet feed operation.

An execution command (code $8C_{HEX}$) corresponds to a one-band print ready command for allowing the printer to output various image signals. Upon reception of the execution command (code $8C_{HEX}$), the printer main body 1 executes a one-band print operation while outputting various image control signals.

An execution command (code $8F_{HEX}$) corresponds to an area designation command for designating a print position, size, and the like of an image to be printed. In this command, data following a header $8F_{HEX}$ can designate a start position and size of an area.

An execution command (code $90_{HEX}$) corresponds to a print enforcement end command. Upon reception of the execution command (code $90_{HEX}$), the printer main body 1 delivers the sheet 7 outside the apparatus, and ends the print operation.

An execution command (code $C3_{HEX}$) corresponds to a sheet feed stage selection command. Since the printer main body 1 comprises two sheet feed stages storing sheets having different sizes, this execution command is transmitted from the controller 310 when one of the sheet feed stages is designated.

A status request command ($40_{HEX}$) shown in FIG. 7B corresponds to a whole status request command for requesting whole status data of the printer main body 1. Upon reception of this status command ($40_{HEX}$), the printer main body 1 assigns whole status data, i.e., data indicating the presence/absence of an error, a busy state, and the like to the respective bits of status data, and responds to the controller 310 using the status data.

A status request command ($44_{HEX}$) corresponds to a sheet information request command, and is transmitted from the controller 310 when the size of sheets stored in the printer main body 1 is to be detected.

A status request command ($46_{HEX}$) corresponds to a command for requesting error details, and is transmitted from the controller 310 when details of an error occurring in the printer main body 1 are to be detected.

A status request command ($52_{HEX}$) is a device type request command which indicates a device connected to the controller 310. In this embodiment, the printer main body 1 is the corresponding device.

A status request command ($54_{HEX}$) is a command for communicating the number of joint pixels described above, and is prepared, so that the controller 310 can cope with a change in the number of joint pixels due to changes in future print processing and the type of printer. This command is transmitted to the printer main body 1.

A status request command ($56_{HEX}$) corresponds to a command for requesting the number of one-band width pixels, and is prepared, so that the controller 310 can cope with a change in the number of print pixels in one line in, e.g., the final band. This command is transmitted to the printer main body 1.

A status request command ($58_{HEX}$) corresponds to a blank length command, and is prepared so that the controller 310 can cope with a change in blank length when future print processing and the type of printer are changed. This command is transmitted to the printer main body 1.

A status request command ($5A_{HEX}$) corresponds to a command for requesting the number of one-band printable pixels, and is prepared so that the controller 310 can cope with a change in the number of one-band printable pixels when future print processing and the type of printer are changed. This command is transmitted to the printer main body 1. FIGS. 8A and 8B show bit structures of the execution command and the status request command shown in FIGS. 7A and 7B. FIG. 8A shows a joint pixel number request command 701, and FIG. 8B shows a one-band width pixel number request command 704. The printer main body 1 which received the joint pixel number request command ($54_{HEX}$) 701 from the controller 310 transmits status data (status 1) 702 (bit "1" to bit "6" represent the number of band leading joint pixels). Note that in this embodiment, since the number of pixels is one, the printer main body 1 sends back status data "$03_{HEX}$".

Bit "0" of the status data (status 1) 702 is set to be "1" when another status data follows, and bit "7" is set to be "1" when a command is abnormal. Thus, the status data is sent back to the controller 310.

Therefore, when the printer main body 1 normally receives the Joint pixel number request command ($54_{HEX}$) 701, "0" is set in bit "7".

The number of band trailing joint pixels is set using bit "1" to bit "6" of status data (status 2) 703, and the status data is sent back to the controller 310.

More specifically, in response to the joint pixel number request command ($54_{HEX}$) 701 from the controller 310, two status data "$03_{HEX}$" 702 and "$04_{HEX}$" 703 are sent back.

When a one-band width pixel number request command ($56_{HEX}$) is transmitted to the printer main body 1, the printer main body 1 represents the upper 6 bits of the number of pixels using bit "1" to bit "6" of status data (status 1) 705, represents the lower 6 bits of the number of pixels using bit "1" to bit "6" of status data (status 2) 706, and sends these status data. For this reason, in this embodiment, since the number of pixels is normally 128 ($80_{HEX}$) except for the last band, the status data (status 1) 705 becomes "$05_{HEX}$", and the status data (status 2) 706 becomes "$00_{HEX}$".

The print control operation of the recording apparatus according to the present invention will be described below with reference to the flow charts shown in FIGS. 9A and 9B.

Figure 9A:
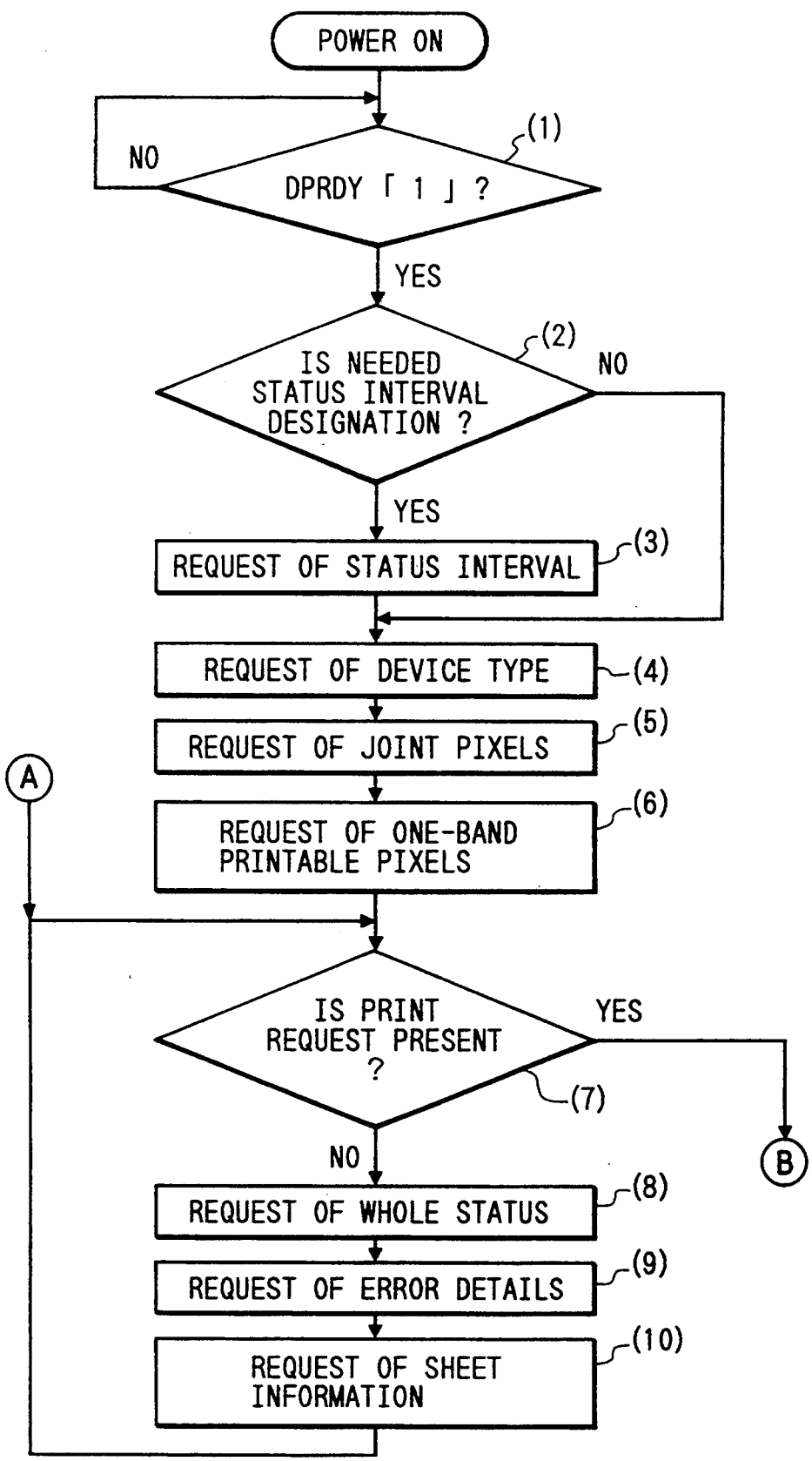

FIGS. 9A and 9B are flow charts showing a print control sequence in the recording apparatus according to the present invention. Note that (1) to (23) designate steps.

The controller 310 checks in step (1) if the printer main body 1 is ready to perform communications (if a communication control signal DPRDY="1"). If YES in step (1), it is checked in step (2) if status interval designation is needed. If NO in step (2), the flow advances to step (4) and the subsequent steps; otherwise, a status interval is designated using the status interval designation command "$81_{HEX}$" in step (3). The type of printer connected to the controller is requested using the device type request command "$52_{HEX}$" in step (4), and the number of joint pixels before and after a band is requested using the Joint pixel number request command "$54_{HEX}$" in step (5).

Then, the number of one-band printable pixels is requested using the one-band printable pixel number request command "$54_{HEX}$" in step (6), thereby confirming the maximum band size which can be printed by the printer main body 1.

It is checked in step (7) if a print request is generated on the controller 310. If YES in step (7), the flow advances to step (11) and the subsequent steps; otherwise, the whole status is requested using the whole status command "$40_{HEX}$" in step (8), and error details are requested using the error detail request command "$46_{HEX}$" in step (9). In addition, sheet information is requested using the sheet information request command "44HEX" in step (10). The flow then returns to step (7).

On the other hand, if YES in step (7) (the print request is generated), a sheet feed stage is designated using the sheet feed stage selection command "$C3_{HEX}$" in step (11).

Then, a blank length is requested using the blank length command "$58_{HEX}$" in step (12) to confirm the blank size. Thereafter, a print area on a sheet is designated using the area designation command "$8F_{HEX}$" in step (13).

The print operation start is designated using the print operation start designation command "$88_{HEX}$" in step (14). In response to this command, the printer main body 1 conveys a sheet from the designated sheet feed stage to a print position, and then starts the print operation.

It is then checked in step (15) if the stop request is generated on the controller 310. If YES in step (15), the print enforcement end command "$90_{HEX}$" is designated in step (16) to stop the print operation, and the flow returns to step (7).

On the other hand, if NO is determined in step (15), the number of one-line pixels is requested using the one-band width pixel number request command "$56_{HEX}$" in step (17). The printer controller 1a of the printer main body 1 calculates the required number of bands on the basis of area designation from the controller 310 to calculate each band width (number of pixels per line), and informs the controller 310 accordingly. The controller 310 calculates the number of pixels to be transmitted on the basis of the received band width and the number of Joint pixels, and prepares for transmission in step (18).

Upon completion of the preparation for transmission, one-band print ready designation is made using the one-band print ready command "$8C_{HEX}$" in step (19).

Upon reception of the one-band print ready command "$8C_{HEX}$", the printer main body 1 sends an image control signal to print one-band data, and to feed a sheet by one band.

The controller 310 then requests the one-band print operation status in the printer main body 1 using the whole status command "$40_{HEX}$" in step (20), and monitors the end of the one-band print operation by the printer main body 1 on the basis of data in the status command.

If it is determined in step (21) that an error occurs or if it is determined in step (22) that the print operation of the final band is ended, the print operation is ended, and the flow returns to step (7).

On the other hand, if no error occurs, and the print operation of the final band is not ended (during the print operation of one page), one-band print end data in the whole status command "$40_{HEX}$" is waited in step (23), and thereafter, the flow returns to step (15) to prepare for transmission of the next band.

Figure 10:
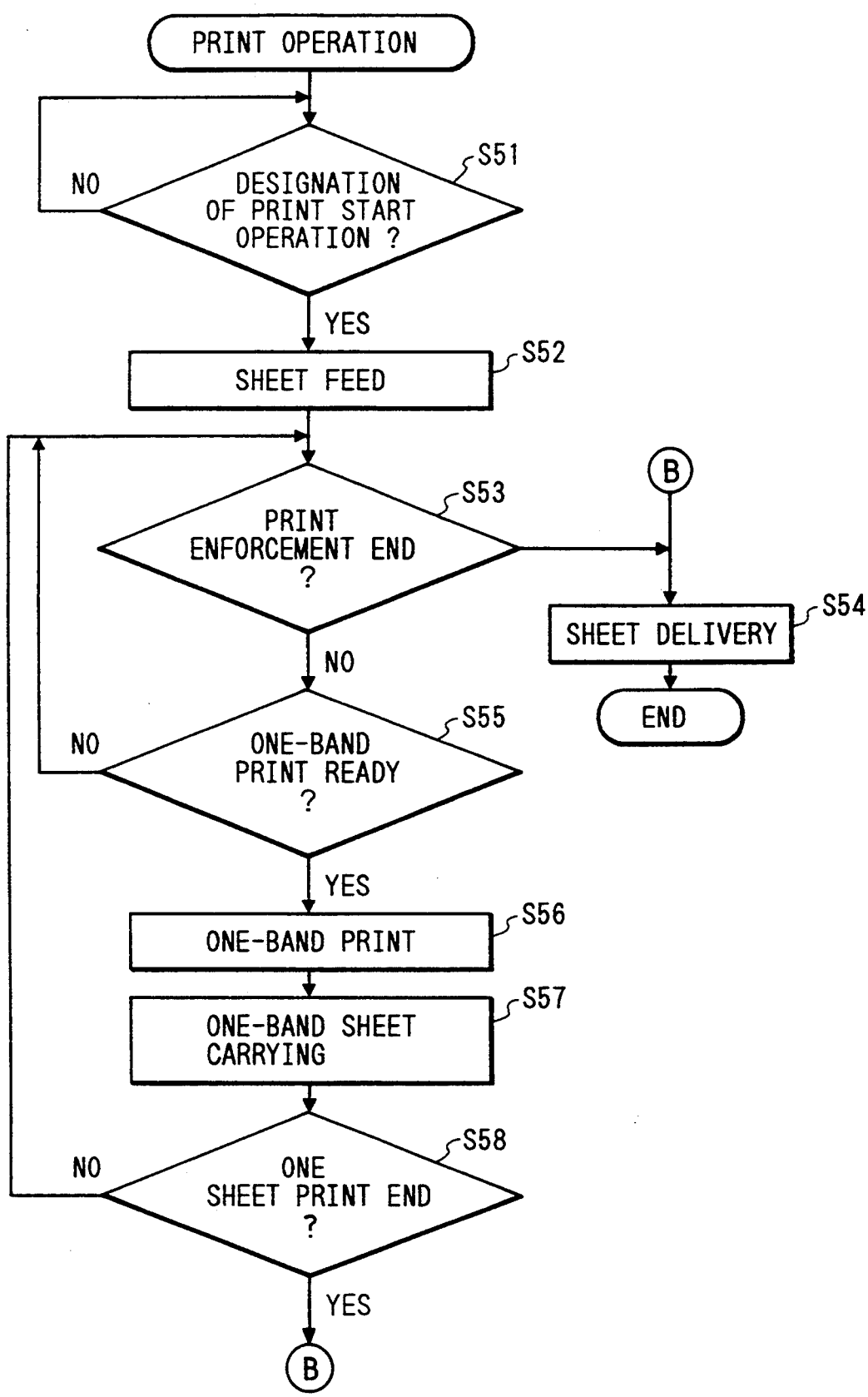
FIG. 10 is a flow chart for explaining a print operation.

Printer control in the print operation will be explained below with reference to the flow chart shown in FIG. 10. If it is determined in step S51 that a print operation start designation command is received from the controller 310, the sheet feed operation is started from the designated sheet feed stage in step S52. If it is determined in step S53 that the print enforcement end command is received, the sheet is delivered, and the print operation is ended in step S54. However, if no print enforcement end command is received, the printer waits for the print ready command in step S55. If the printer receives the print ready command, it executes a one-band print operation in step S56. Upon completion of the print operation of the entire area, the sheet is delivered in step S58, and the print operation is ended.

As described above, according to this embodiment, since the binarization means for obtaining binary print data corresponding to a unit print width on the basis of print data exceeding the unit print width of the recording means, and the first communication means for sending back a print data amount exceeding the unit print width in accordance with an external request are arranged, the print data amount exceeding the unit print width of the recording means can be easily informed to an external apparatus in accordance with the external request. Even when a receivable unit print width varies in units depending on the type of printer, print data can be received without disturbing binarization processing. Since a print data amount exceeding a unit print width can be set in units depending on the type of printer, the capacity of the image buffer can be decreased as much as possible, and memory cost can be greatly reduced.

Since the second communication means for sending back a desired reception data amount corresponding to an arbitrary print width which can be printed by the recording means in accordance with an external request is provided, even if an abnormality occurs in the recording means due to any cause, print data corresponding to a possible print width can be received, and print processing free from trouble can be continued.

Furthermore, since the recording means records a color image on a recording medium on the basis of externally input print data, an image can be recorded on the recording medium while generating binary print data corresponding to a unit print width on the basis of color print data exceeding the unit print width of the recording means.

Therefore, a print data capacity matching with a print condition of the recording means can be informed to an external apparatus, and even when the type of printer is changed, communication processing of print data can be easily continued.

An embodiment wherein the type of sheet is further selected using a sheet feed stage selection command ($C3_{HEX}$) will be described below.

Figure 11:
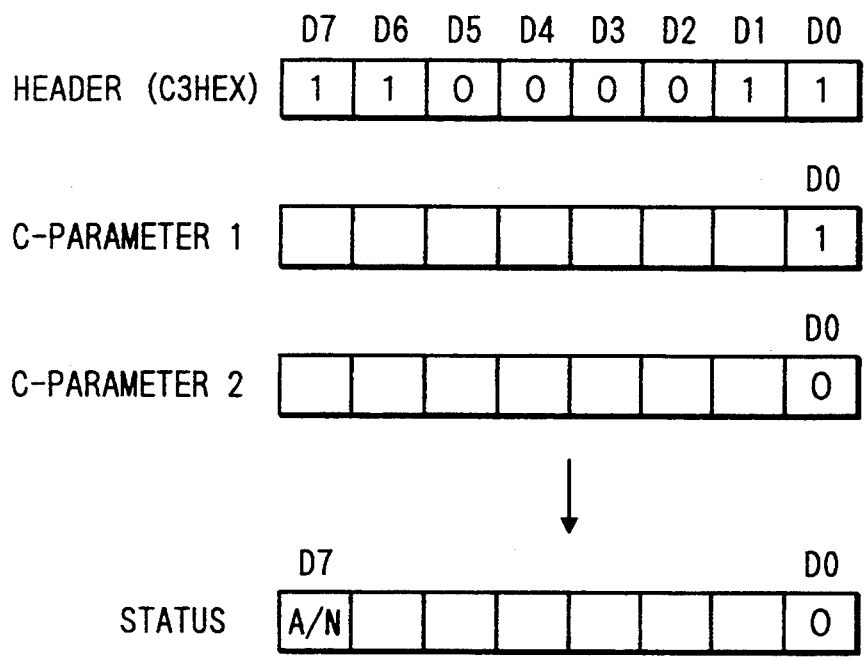
FIG. 11 is an illustration showing in detail a sheet feed stage selection command.

FIG. 11 shows the sheet feed stage selection command in detail. The type of sheet is selected using an operation unit (not shown) of a controller 310, and is instructed to a printer 1 through communication lines. The printer 1 of this embodiment has, as sheet feed means, roll paper, a cassette storing cut sheets, and a manual feed function. One of these means is selected using a C-parameter 1.

As the types of sheet, three types of sheet, i.e., normal or usual sheets, back print films, and OHP sheets are available, and one of these types of sheet is selected by a C-parameter 2. The back print film is prepared by coating an ink absorbing material on a sheet formed of a transparent material such as PET, and the surface coated with the ink absorbing material will be referred to as a coat surface hereinafter. When a print operation is performed from the coat surface side, since ink is absorbed by the absorbing material, a printed image can be observed from the non-coat surface side. Since the non-coat surface is formed of PET, a glossy reproduced image can be obtained. In this case, light may be radiated on the image using, e.g., a fluorescent lamp from the coat surface side, so as to be used in, e.g., a display.

However, depending on whether or not an image is observed while radiating light on an image from the coat surface side, hues vary due to an overlapping state of inks, transmittance of light, and the like. Thus, a case wherein light is radiated on an image is defined as an internal illumination mode, and a case wherein no light is radiated on an image is defined as a reflection mode, so that hues are changed by image processing (by a UCR circuit, a gamma conversion, or the like). Since an image is printed on the coat surface, and is observed from the non-coat surface side, a mirror image must be printed. In this embodiment, the controller 310 outputs image data as a mirror image.

Since an OHP sheet is a sheet formed of a material such as PET, the ink absorption property of the OHP sheet is inferior to that of normal sheets. In this embodiment, when an OHP sheet is used, C and M images are printed first, and then, Y and K images are printed without feeding the sheet under the control of an output control circuit, so that inks can be absorbed while spending a long period of time for a single print operation. Therefore, in this embodiment, when an image is printed on an OHP sheet, the controller 310 outputs the same image twice for each band to obtain a reproduced image.

Print control in the controller 310 will be described below with reference to the flow charts shown in FIGS. 12A and 12B. It is checked in step S800 (based on a DPRDY signal as one of communication signals) if the printer is ready to perform communications. If it is determined in step S800 that the printer is ready to perform communications, it is checked in step S801 if status interval designation is needed. If YES in step S801, a status interval is designated using a status interval designation command (81H) in step S802. The type of the printer 1 connected to the controller is confirmed using a device type request (52H) in step S803. The number of joint pixels before and after a given band is requested using a joint pixel number request (54H) in step S804. The maximum band size which can be printed by the printer is confirmed using a one-band printable pixel number request (5AH) in step S805. It is then checked in step S806 if a print request is generated on the controller 310. If NO in step S806, the printer state is always monitored using a whole status request (40H), an error detail request (46H), and a sheet information request (44H) in steps S807, S808, and S809.

If YES in step S806, a sheet feed stage, a sheet type, and the like are designated using a sheet feed stage selection command (C3H) in step S901. After the sizes of blanks on a sheet are confirmed using a blank length request (58H) in step S902, a print area on the sheet is designated using an area designation command (8FH) in step S903. Then, a print operation start designation command (88H) is issued in step S904. The printer 1 starts a print operation, e.g., conveys a sheet from the designated sheet feed stage to a print start position, and so on, as will be described in detail later.

If it is determined in step S905 that a stop request is generated on the controller, a print enforcement end command (90H) is issued to stop the print operation in step S906. If no stop request is generated, the number of one-band pixels is requested using a one-band pixel number request (56H) in step S907. The printer 1 calculates the required number of bands on the basis of the area designation from the controller 310, and also calculates each band width (the number of pixels per line). The printer sequentially informs the calculation results to the controller 310. The controller calculates the number of pixels to be transmitted on the basis of the received band width and the number of joint pixels, and prepares for transmission of pixels in step S908.

When a one-band image is prepared, if it is determined in step S909 that a back print film is selected, a mirror image output setting operation is performed in step S910. In this embodiment, the image position is inverted on a memory to form a mirror image. Then, a one-band print ready command (8CH) is issued in step S911. Upon reception of the one-band print ready command, the printer 1 outputs image control signals to print one-band data, and to feed a sheet by one band. The controller 310 requests a whole status, and waits for the end of the one-band print operation in step S912.

If it is determined in step S913 that an error occurs or if it is determined in step S914 that one-page print end data is received before the one-band print operation is ended, the print operation is stopped. If it is determined in step S915 that one-band print end data is received, it is checked in step S916 if the first one-band print operation on the OHP sheet is ended. If YES in step S916, the same data is output again; otherwise, the next band is developed.

Figure 13:
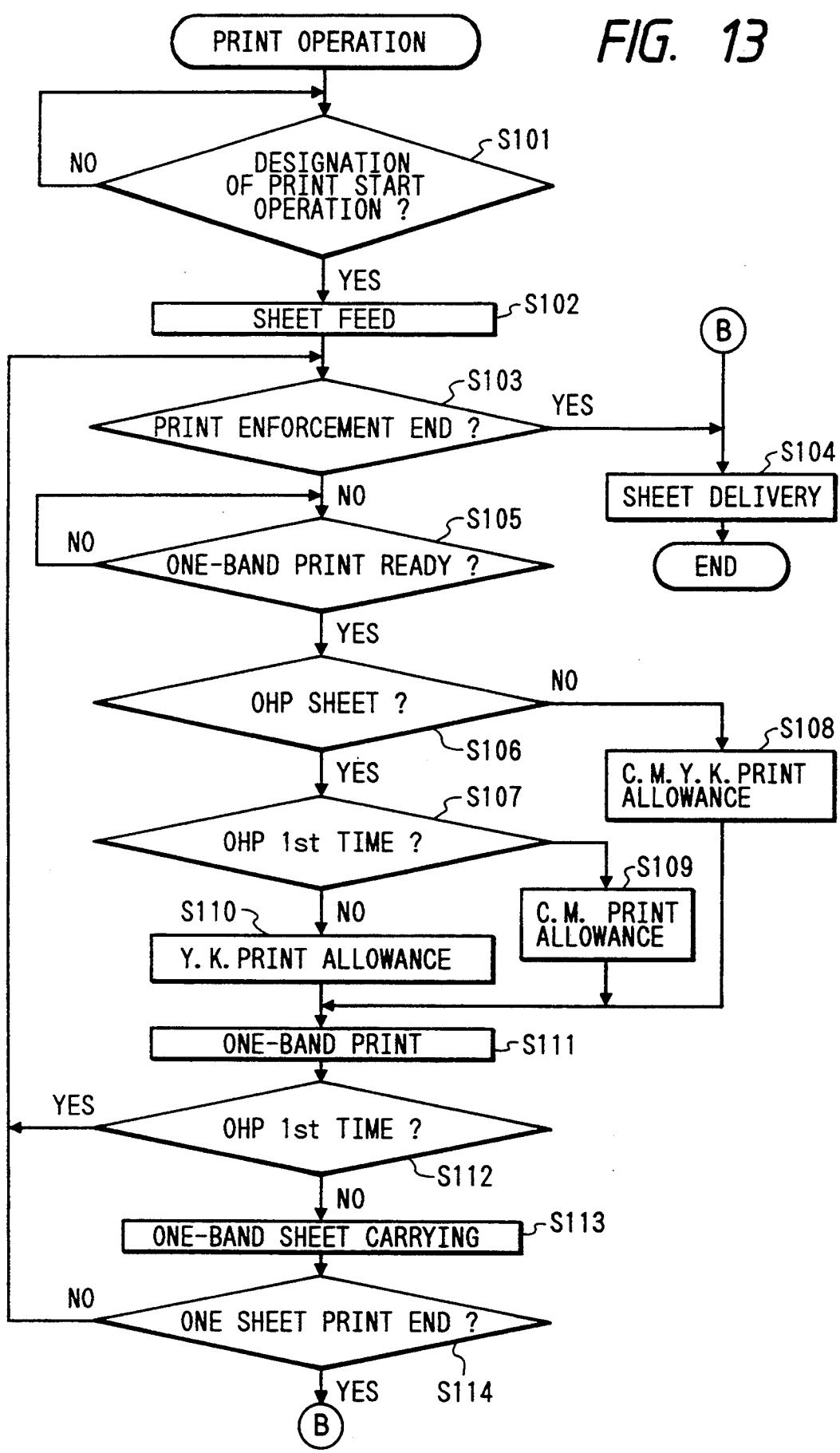
FIG. 13 is a flow chart for explaining another print operation.

Printer control in the print operation will be described below with reference to the flow chart shown in FIG. 13. When the print operation start designation command is received from the controller in step S101, a sheet feed operation from the designated sheet feed stage is started in step S102. If a print enforcement end command is received in step S103, a sheet is delivered, and the print operation is ended in step S104. If no print enforcement end command is received, a print ready command is waited in step S105. Upon reception of the print ready command, it is checked in step S106 if an OHP sheet is selected. If NO in step S106, an output control circuit 406 simultaneously prints C, M, Y, and K images in step S108. If the OHP sheet is selected, and the first one-band print operation is to be performed, a print operation of only C and M images is permitted (steps S107 and S109), and if it is determined that the second one-band print operation is to be performed, a print operation of only Y and K images is permitted in step S110. Thereafter, the one-band print operation is performed in step S111. If it is determined in step S112 that the first one-band print operation for the OHP sheet is performed, the flow returns to a one-band print ready waiting state. If the second one-band print operation is ended or another type of sheet is selected, a sheet is fed by one band in step S113. If it is determined in step S114 that the print operation of the entire area is not ended, the flow returns to a print ready command waiting state in steps S103 and S105. If it is determined that the print operation of the entire area is ended, the sheet is delivered in step S104, and the print operation is ended.

As described above, according to this embodiment, the full-color printer 1, which comprises multi-nozzle heads in correspondence with respective colors, reproduced image on the basis of image data from the controller, communicates the sheet type with the controller 310, and changes an image data communication method accordingly, so that various types of sheets can be used with a simple arrangement, and no large-capacity storage memory is required.

In the above embodiment, the sheet type is selected by the controller. However, the printer may detect the sheet type and communicate it to the controller as status data, and the controller may perform image output control based on the received data. If the sheet type is detected by the printer, a command for updating to new data every other print operation if an OHP sheet is selected, or a command for outputting a mirror image if a back print film is selected is issued from the printer to the controller in units of bands, and the controller outputs an image according to the command, the controller need not determine the sheet type to change its control.

Note that this embodiment has exemplified a recording apparatus using a recording head which adopts a specific ink-jet method among ink-jet recording methods, and forms flying liquid droplets by utilizing heat energy to record an image.

The typical arrangement and principle of the ink-jet recording method are preferably realized based on the basic principle disclosed in U.S. Pat. Nos. 4,723,129 and 4,740,796. This method can be applied to both so-called on-demand and continuous type apparatuses. In particular, the on-demand type apparatus is advantageous for the following reason. More specifically, at least one drive signal for causing an abrupt temperature rise exceeding nucleate boiling in correspondence with recording data is applied to an electro-thermal converter arranged in correspondence with a sheet for holding a liquid (ink) or a liquid channel, thus causing the electro-thermal converter to produce heat energy. The heat energy is applied to the heat application surface of the recording head to cause film boiling, and as a result, a bubble in a liquid (ink) can be formed in one-to-one correspondence with the drive signal. The liquid (ink) is discharged via a discharging opening upon growth/shrinkage of the bubble, thus forming at least one droplet. It is more preferable to use a pulse drive signal since growth/shrinkage of bubbles can be immediately and properly performed, and a liquid (ink) discharging operation having a short response time can be attained. As the pulse drive signal, one described in U.S. Pat. Nos. 4,463,359 and 4,345,262 is suitable. In addition, if conditions described in U.S. Pat. No. 4,313,124 disclosing the invention associated with a rate of temperature rise of the heat application surface are adopted, better recording operations can be performed.

As an arrangement of the recording head, in addition to an arrangement (linear liquid channel or right-angle liquid channel) as a combination of discharge orifices, a liquid channel, and electro-thermal converters, as disclosed in the above-mentioned specifications, an arrangement which has a heat application portion arranged in a curved region, as disclosed in U.S. Pat. Nos. 4,558,333 and 4,459,600 is included in the present invention. In addition, the present invention is also effective with an arrangement which has a common slit serving as a discharge portion of a plurality of electro-thermal converters, as disclosed in Japanese Patent Application Laid-Open No. 59-123670, and with an arrangement Which has orifices, corresponding to a discharge portion, for absorbing a pressure wave of heat energy, as disclosed in Japanese Patent Application Laid-Open No. 59-138461.

As a recording head of a full-line type having a length corresponding to the width of a largest recording medium which can be recorded by the recording apparatus, an arrangement achieving a prescribed length by combining a plurality of recording heads as disclosed in the above specifications, or an arrangement of a single, integral recording head may be adopted.

Moreover, the present invention is also effective when an exchangeable chip type recording head, which electrically connects with an apparatus main body, and ink supply from the apparatus main body when it is attached to an apparatus main body, or a cartridge type recording head, integrally arranged on a recording head itself, is used.

It is preferable to add a recovery means, a preliminary assist means, and the like for a recording head as an arrangement of a recording apparatus of the present invention since a recording operation can be further stabilized. More specifically, these means include a capping means, a cleaning means, a compression or suction means, a preheating means consisting of an electro-thermal converter, a heating element separate from the converter, or a combination of these, and the like. In addition, it is also effective to execute a preliminary discharge mode before recording so as to attain a stable recording operation.

Furthermore, as a recording mode of the recording apparatus, in addition to a recording mode using only principal colors such as black, the present invention may be applied to an apparatus which comprises at least one of a multi-color mode using different colors, and a full-color mode based on color mixing, which may be attained by integrally arranging a recording head or by combining a plurality of recording heads.

In the embodiment of the present invention described above, a liquid ink is used. The present invention may use an ink which is solid at room temperature, or an ink which is softened at room temperature. The above-mentioned ink-jet apparatus generally performs temperature control within a range between 30° C. and 70° C., so that an ink viscosity can fall within a stable discharge range. For this reason, an ink need only be liquified when a recording signal to be used is applied. In addition, a temperature rise caused by heat energy is prevented by positively using the heat energy as energy for changing an ink state from a solid state to a liquid state, or an ink which is solidified when it is left unused is used for the purpose of preventing evaporation of an ink. In any case, the present invention is applicable to inks which can be liquified upon application of heat energy, such as an ink which is liquified upon application of heat energy according to a recording signal, and is discharged as an ink liquid, or an ink which begins to be solidified when it reaches a recording medium. In this case, an ink may oppose an electro-thermal converter while being held in recess portions or through-holes of a porous sheet, as disclosed in Japanese Patent Application Laid-Open No. 54-56847 or 60-71260. In the present invention, the most effective apparatus for the above-mentioned inks is an apparatus for executing the above-mentioned film boiling method.

What is claimed is:

1. A method in a communication control system between a device for outputting image data, and a recording apparatus for recording an image on a recording medium in units of predetermined unit recording widths in accordance with the image data output from the device, said method comprising the steps of:

requesting from said device to said recording apparatus, information associated with an image data amount necessary for recording an image in the predetermined unit recording width;

sending back the information associated with the image data amount from said recording apparatus to said device in response to the request from said device, wherein the information associated with the image data amount is variable; and recording the image on the recording medium with a recording head having a plurality of recording elements corresponding to the unit recording width, wherein the image is recorded by executing a main scan in a direction different from an array direction of said plurality of recording elements and executing a sub-scan by a distance corresponding to the predetermined unit recording width in a direction different from the main scan direction after completion of the main scan.

2. A method according to claim 1, wherein said device outputs desired image data to said recording apparatus on a basis of the information associated with the image data amount.

3. A method according to claim 1 or 2, wherein said recording head is relatively moved in the main scan direction adjacent the recording medium to thereby record an image of the predetermined recording width on the recording medium, and after completion of recording of the image, said recording head is relatively moved in the sub-scan direction adjacent the recording medium.

4. A method according to claim 3, wherein the information associated with the image data amount is information indicating the unit recording width.

5. A method according to claim 4, further comprising the step of obtaining recording data corresponding to the unit recording width in accordance with image data of an amount exceeding the unit recording width.

6. A method according to claim 3, wherein the information associated with the image data amount is information indicating an image data amount exceeding the unit recording width.

7. A method according to claim 5, further comprising binarizing image data of a pixel of interest in consideration of image data of pixels around the pixel of interest.

8. A system according to claim 1, wherein the step of recording the image on the recording medium includes discharging an ink from a discharge outlet of an ink-jet recording head of the recording apparatus.

9. A method according to claim 8, wherein in said recording step, the ink-jet recording head discharges inks of a plurality of colors from said discharge outlet.

10. A method according to claim 8 or 9, wherein the ink-jet recording head comprises heat energy generating means, arranged in correspondence with the discharge outlet, and, in said recording step, causes a change in state of the ink due to heat, and discharges the ink from the discharge outlet on the basis of the change in state, thereby forming a flying liquid droplet.

11. A method in a communication control system between a device for outputting image data, and a recording apparatus for recording an image on a recording medium in accordance with the image data output from the device, said method comprising the steps of:

requesting, from said device to said recording apparatus, information associated with a type of recording medium;

sending back the information associated with the type of recording medium from said recording apparatus to said device in response to the request from said device;

transmitting image data in different communication modes in accordance with the information associated with the type of recording medium from said device; and recording the image on the recording medium in units of predetermined unit recording widths, wherein when the recording medium is a first recording medium, said device transmits different image data in units of recording operations corresponding to the unit recording widths, and when the recording medium is a second recording medium, said device transmits the same image data a plurality of times for a recording operation of the predetermined unit recording width.

12. A method according to claim 11, wherein the second recording medium is an OHP recording medium.

13. A method according to claim 11, wherein said step of recording the image on the recording medium includes discharging an ink from a discharge outlet of an ink-jet recording head of the recording apparatus.

14. A method according to claim 13, wherein in said recording step the ink-jet recording head discharges inks of a plurality of colors from the discharge outlet.

15. A method according to claim 13 or 14, wherein the ink-jet recording head comprises heat energy generating means, arranged in correspondence with the discharge outlet, and, in said recording step, causes a change in state of the ink due to heat, and discharges the ink from the discharge outlet on a basis of the change in state, thereby forming a flying liquid droplet.

16. A method according to claim 6, further comprising the step of obtaining recording data corresponding to the unit recording width in accordance with image data of an amount exceeding the unit recording width.

17. A method according to claim 16, further comprising binarizing image data of a pixel of interest in consideration of image data of pixels around the pixel of interest.

18. A recording apparatus for recording on a recording medium an image in accordance with image data outputted from a data output device by using a recording head having a plurality of recording elements, said apparatus comprising:

main scan means for executing a main scan of the recording head to thereby record on the recording medium an image of predetermined recording width corresponding to the plurality of recording elements;

sub-scan means for executing a sub-scan by a distance corresponding to the predetermined recording width after completion of the main scan;

sending means for sending to the data output device information on an amount of image data required for recording an image of the predetermined recording width, in response to a request signal from the data output device; and process means for obtaining image data corresponding to the predetermined recording width from image data of which amount is based on the information, outputted from the data output device, wherein the recording head is driven in accordance with the image data obtained by said process means.

19. An apparatus according to claim 18, wherein said process means obtains image data corresponding to the predetermined recording width from image data of which amount exceeds that of image data corresponding to the predetermined recording width.

20. An apparatus according to claim 19, wherein said process means binarises image data of a pixel under consideration in view of image data of adjacent pixels.

21. An apparatus according to claim 18, wherein said main scan means executes the main scan by moving the recording head in a direction different from an array direction of the plurality of recording elements.

22. An apparatus according to any one of claims 18 to 23, wherein said recording head records an image by ejecting ink droplets through a discharge outlet in accordance with image data.

23. An apparatus according to claim 22, further comprising more than one said recording head, each recording head for recording in a different color and a color image is recorded by ejecting plural color ink droplets from the recording heads of respective colors.

24. An apparatus according to claim 22, wherein said recording head ejects ink droplets through said discharge outlet by causing a change in state of ink by means of thermal energy.

25. An apparatus according to claim 23, wherein each recording head ejects ink droplets through the discharge outlet by causing a change in state of ink by means of thermal energy.

26. A data output device for outputting image data to a recording apparatus which records an image of a predetermined recording width on a recording medium by executing a main scan of at least one recording head having a plurality of recording elements, said data output device comprising:

request signal output means for outputting to the recording apparatus a request signal for requesting information on an amount of image data required for recording the image of the predetermined recording width; and image data output means for outputting to the recording apparatus image data of which amount is based on the information sent from the recording apparatus in response to the request signal.

27. A device according to claim 26, wherein the information indicates that image data of which amount exceeds that of image data of the predetermined recording width is required for recording an image of the predetermined recording width.

28. A device according to claim 26, wherein the recording apparatus includes a plurality of recording heads for recording in different recording colors, and said image data output means outputs to the recording apparatus image data of plural colors corresponding to the plurality of recording heads.

29. A device according to any one of claims 26 to 28, wherein each recording head records an image by ejecting ink droplets through discharge outlets in accordance with the image data.

30. A device according to claim 29, wherein each recording head ejects the ink droplets through the discharge outlets by causing a change in state of ink using thermal energy.

31. A recording apparatus for recording an image on a recording medium in accordance with image data outputted from a data output device, using a recording head having a plurality of recording elements, said recording apparatus comprising:

main scan means for executing a main scan of the recording head to thereby record on the recording medium an image of a predetermined recording width corresponding to the plurality of recording elements;

sub-scan means for executing a sub-scan by a distance corresponding to the predetermined recording width after completion of the main scan;

sending means for sending to the data output device information on a type of the recording medium in response to a request signal from the data output device; and process means for processing image data sent from the data output device in one of plural modes according to the information, wherein said data output device outputs different image data for each main scan when the information indicates a first type of recording medium, while said data output device otherwise outputs the same image data for main scans a plurality of times when the information indicates a second type of recording medium, and wherein the recording head is driven in accordance with the image data processed by said process means.

32. An apparatus according to claim 31, wherein the second type of recording medium is an OHP recording material.

33. An apparatus according to claim 31 or 32, wherein said main scan means executes the main scan by moving the recording head in a direction different from an array direction of the plural recording elements.

34. An apparatus according to claim 31, wherein said process means binarizes image data sent from the data output device.

35. An apparatus according to claims 31 or 32, wherein the recording head records an image by ejecting ink droplets through a discharge outlet.

36. An apparatus according to claim 33, wherein the recording head records an image by ejecting ink droplets through a discharge outlet.

37. An apparatus according to claim 34, wherein the recording head records an image by ejecting ink droplets through a discharge outlet.

38. An apparatus according to claim 35, wherein a plurality of recording heads are used and each recording head records in a different color and a color image is recorded by ejecting ink droplets of plural colors from the recording heads of respective colors.

39. An apparatus according to claim 36, wherein a plurality of recording heads are used and each recording head records in a different color and a color image is recorded by ejecting ink droplets of plural colors from the recording heads of respective colors.

40. An apparatus according to claim 37, wherein a plurality of recording heads are used and each recording head records in a different color and a color image is recorded by ejecting ink droplets of plural colors from the recording heads of respective colors.

41. An apparatus according to claim 35, wherein the recording head ejects ink droplets through discharge outlets by causing a change in state of ink by means of thermal energy.

42. An apparatus according to claim 36, wherein the recording head ejects ink droplets through discharge outlets by causing a change in state of ink by means of thermal energy.

43. An apparatus according to claim 37, wherein the recording head ejects ink droplets through discharge outlets by causing a change in state of ink by means of thermal energy.

44. An apparatus according to claim 38, wherein each recording head ejects ink droplets through discharge outlets by causing a change in state of ink by means of thermal energy.

45. An apparatus according to claim 39, wherein each recording head ejects ink droplets through discharge outlets by causing a change in state of ink by means of thermal energy.

46. An apparatus according to claim 40, wherein each recording head ejects ink droplets through discharge outlets by causing a change in state of ink by means of thermal energy.

47. A data output device for outputting image data to a recording apparatus which records on a recording medium an image of a predetermined recording width by executing a main scan of at least one recording head having a plurality of recording elements, said device comprising:

request signal output means for outputting to the recording apparatus a request signal for requesting information on a type of the recording medium; and image data output means for outputting image data to the recording apparatus in a one of plural modes according to the information sent from the recording apparatus in response to the request signal, wherein said image data output device outputs different image data for each main scan when the information indicates a first type of recording medium, while said image data output device otherwise outputs the same image data for main scans a plurality of times when the information indicates a second type of recording medium.

48. A device according to claim 47, wherein the second type of recording medium is an OHP recording material.

49. A device according to claim 47, wherein the recording apparatus includes a plurality of recording heads of respective different recording colors, and said image data output means outputs to the recording apparatus image data of plural colors corresponding to the plurality of recording heads.

50. A device according to claim 49, wherein each recording head records an image by ejecting ink droplets through discharge outlets in accordance with image data.

51. An apparatus according to claim 50, wherein each recording head ejects ink droplets through discharge outlets by causing a change in state of ink by means of thermal energy.

52. A method in a communication control system between a device for outputting image data, and a recording apparatus for recording an image on a recording medium in accordance with the image data output from the device, said method comprising the steps of:

requesting, from the device to the recording apparatus, information associated with a recording operation;

sending back the information associated with the recording operation from the recording apparatus to the device in response to the request from the device;

transmitting image data in different communication modes in accordance with the information associated with the recording operation from the device; and recording the image on the recording medium in units of predetermined unit recording widths, wherein the device transmits different image data in a recording operation corresponding to the predetermined unit recording widths in a first communication mode, and the device transmits the same image data a plurality of times for a recording operation of the predetermined unit recording width in a second communication mode.

53. A method according to claim 52, wherein the information associated with a recording operation is information indicating a type of the recording medium.

54. A method according to claim 53, wherein when the recording medium is an OHP recording medium, the device transmits the image data to the recording apparatus in the second communication mode.

55. A method according to claim 52, wherein said step of recording the image on the recording medium includes discharging ink from a discharge outlet of an ink-jet recording head of the recording apparatus.

56. A method according to claim 55, wherein the ink-jet recording head comprises heat energy generating means, arranged in correspondence with the discharge outlet, and, in said recording step, causes a change in state of the ink due to heat, and discharges the ink from the discharge outlet on a basis of the change in state, thereby forming a flying liquid droplet.

57. A method according to claim 55, wherein in said recording step the ink-jet recording head discharges inks of a plurality of colors from plural discharge outlets.

58. A method according to claim 57, wherein the ink-jet recording head comprises heat energy generating means, arranged in correspondence with the discharge outlets, and, in said recording step, causes a change in state of the ink due to heat, and discharges the ink from the discharge outlets on a basis of the change in state, thereby forming flying liquid droplets.

59. A recording apparatus for recording an image on a recording medium in accordance with image data outputted from a data output device, using a recording head having a plurality of recording elements, said recording apparatus comprising:

main scan means for executing a main scan of the recording head to thereby record on the recording medium an image of a predetermined recording width corresponding to the plurality of recording elements;

sub-scan means for executing a sub-scan by a distance corresponding to the predetermined recording width after completion of the main scan;

sending means for sending to the data output device information associated with a recording operation in response to a request signal from the data output device; and processing means for processing image data sent from the data output device in one of plural modes according to the information, wherein said data output device outputs different image data for each main scan in a first mode, while said data output device otherwise outputs the same image data for main scans a plurality of times in a second mode, and wherein the recording head is driven in accordance with the image data processed by said processing means.

60. An apparatus according to claim 59, wherein the information associated with a recording operation indicates a type of the recording medium.

61. An apparatus according to claim 60, wherein when the recording medium is an OHP recording medium, the image data is transmitted from the data output device in the second mode.

62. An apparatus according to claim 59, wherein said main scan means executes the main scan by moving the recording head in a direction different from an array direction of the plurality of recording elements.

63. An apparatus according to claim 59, wherein said processing means binarizes image data sent from the data output device.

64. An apparatus according to claim 59, wherein the recording head records an image by ejecting ink droplets through a discharge outlet.

65. An apparatus according to claim 62, wherein the recording head records an image by ejecting ink droplets through a discharge outlet.

66. An apparatus according to claim 63, wherein the recording head records an image by ejecting ink droplets through a discharge outlet.

67. An apparatus according to claim 64, wherein a plurality of recording heads are used and each recording head records in a different color and a color image is recorded by ejecting ink droplets of plural colors from the recording heads of respective colors.

68. An apparatus according to claim 65, wherein a plurality of recording heads are used and each recording head records in a different color and a color image is recorded by ejecting ink droplets of plural colors from the recording heads of respective colors.

69. An apparatus according to claim 66, wherein a plurality of recording heads are used and each recording head records in a different color and a color image is recorded by ejecting ink droplets of plural colors from the recording heads of respective colors.

70. An apparatus according to claim 64, wherein the recording head ejects ink droplets through the discharge outlet by causing a change in state of ink by means of thermal energy.

71. An apparatus according to claim 65, wherein the recording head ejects the ink droplets through the discharge outlet by causing a change in state of ink by means of thermal energy.

72. An apparatus according to claim 66, wherein the recording head ejects ink droplets through the discharge outlet by causing a state of ink by means of thermal energy.

73. An apparatus according to claim 67, wherein each recording head ejects ink droplets through discharge outlets by causing a change in state of ink by means of thermal energy.

74. An apparatus according to claim 68, wherein each recording head ejects ink droplets through discharge outlets by causing a change in state of ink by means of thermal energy.

75. An apparatus according to claim 69, wherein each recording head ejects ink droplets through discharge outlets by causing a change in state of ink by means of thermal energy.

76. A data output device for outputting image data to a recording apparatus which records on a recording medium an image of a predetermined recording width by executing a main scan of at least one recording head having a plurality of recording elements, said device comprising:

request signal output means for outputting to the recording apparatus a request signal for requesting information associated with a recording operation; and image data output means for outputting image data to the recording apparatus in one of plural modes according to the information sent from the recording apparatus in response to the request signal, wherein said image data output means outputs different image data for each main scan in a first mode, while said image data output means otherwise outputs the same image data for main scans a plurality of times in a second mode.

77. A device according to claim 76, wherein the information associated with a recording operation is information indicating a type of the recording medium.

78. A device according to claim 77, wherein when the recording medium is an OHP recording medium, said image data output means outputs the image data to the recording apparatus in the second mode.

79. A device according to claim 76, wherein the recording apparatus includes a plurality of recording heads of respective different recording colors, and said image data output means outputs to the recording apparatus image data of plural colors corresponding to the plurality of recording heads.

80. A device according to claim 79, wherein each recording head records an image by ejecting ink droplets through discharge outlets in accordance with the image data.

81. A device according to claim 80, wherein each recording head ejects ink droplets through the discharge outlets by causing a change in state of ink by means of thermal energy.

* * * * *

UNITED STATES PATENT AND TRADEMARK OFFICE
CERTIFICATE OF CORRECTION

PATENT NO. : 5,440,410
DATED : August 8, 1995
INVENTOR(S) : Kiyohisa SUGISHIMA

Figure 12A:
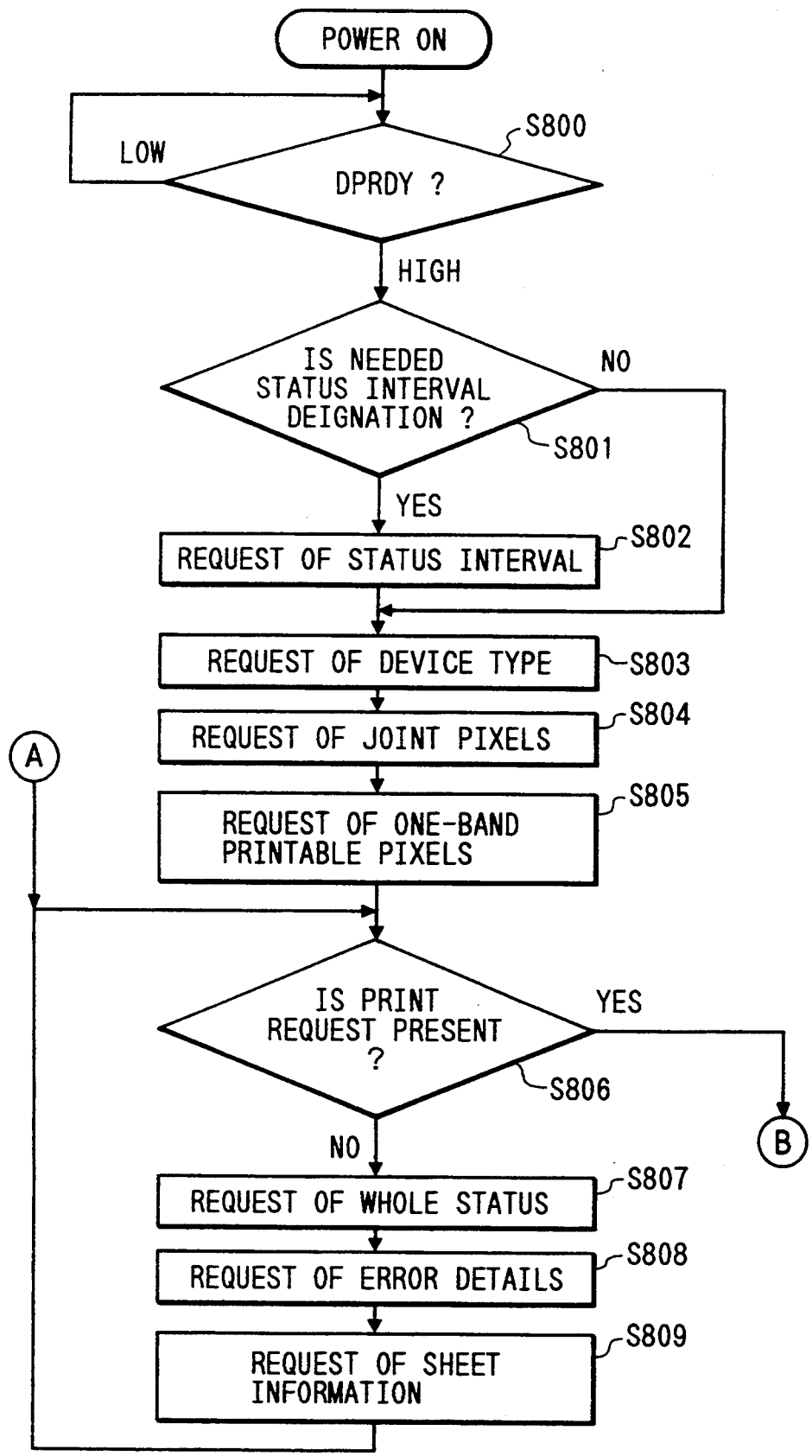
Figures 2, 12B:
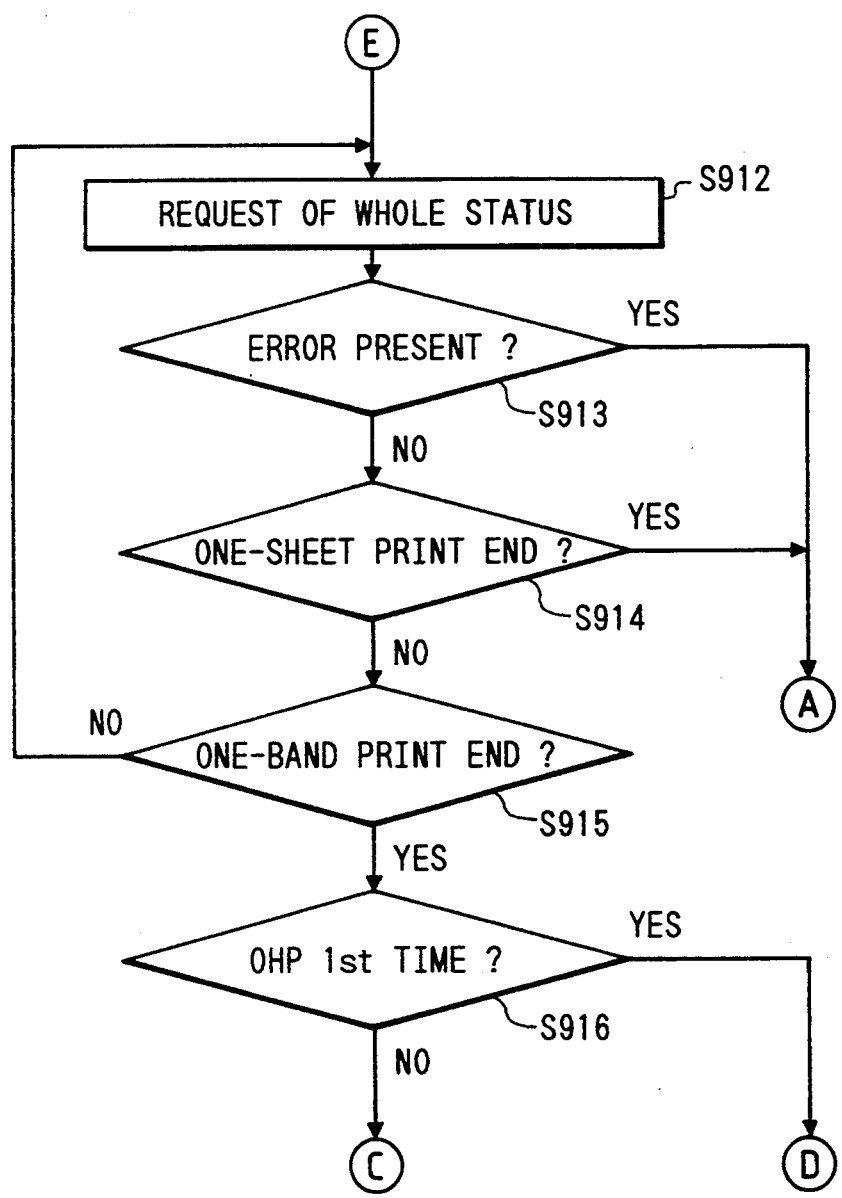

It is certified that error appears in the above-indentified patent and that said Letters Patent is hereby corrected as shown below:

DRAWING SHEET 11 OF 14:

Figure 12A, Step S801, "DEIGNATION" should read --DESIGNATION--.

COLUMN 3:

Line 24, "8,128 mm" should read --8.128 mm--.

COLUMN 7:

Line 27, "Joint" should read --joint--;
Line 67, "Joint" should read --joint--.

COLUMN 8:

Line 45, "Joint" should read --joint--.

COLUMN 13:

Line 1, "Which" should read --which--.

COLUMN 14:

Line 50, "system" should read --method--.

UNITED STATES PATENT AND TRADEMARK OFFICE
CERTIFICATE OF CORRECTION

PATENT NO. : 5,440,410  
DATED : August 8, 1995  
INVENTOR(S) : Kiyohisa SUGISHIMA Page 2 of 2

It is certified that error appears in the above-indentified patent and that said Letters Patent is hereby corrected as shown below:

COLUMN 16:

Line 10, "binarises" should read --binarizes--;  
Line 17, "23," should read --21,--.

COLUMN 18:

Line 53, "An apparatus" should read --A device--.

Signed and Sealed this

Nineteenth Day of December, 1995

Attest:

BRUCE LEHMAN

Attesting Officer     Commissioner of Patents and Trademarks